Oct. 12, 1948.　　　C. F SCOTT ET AL　　　2,451,244
GLIDER TOW INDICATOR
Filed March 22, 1945　　　　　　　　　　　2 Sheets-Sheet 1
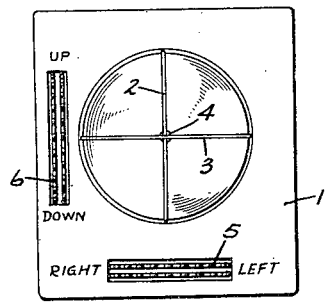
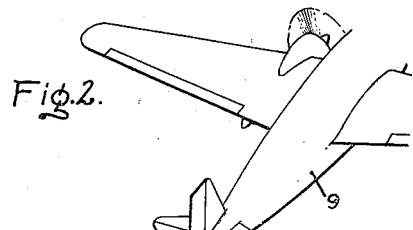
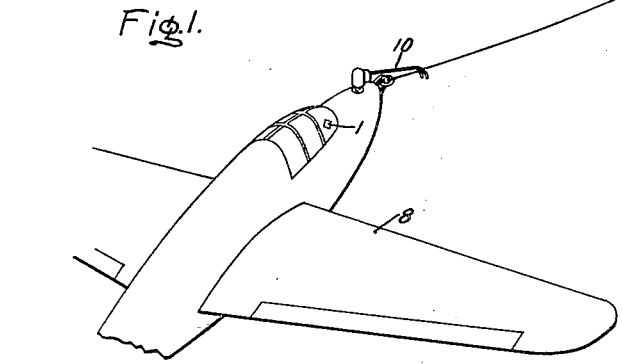
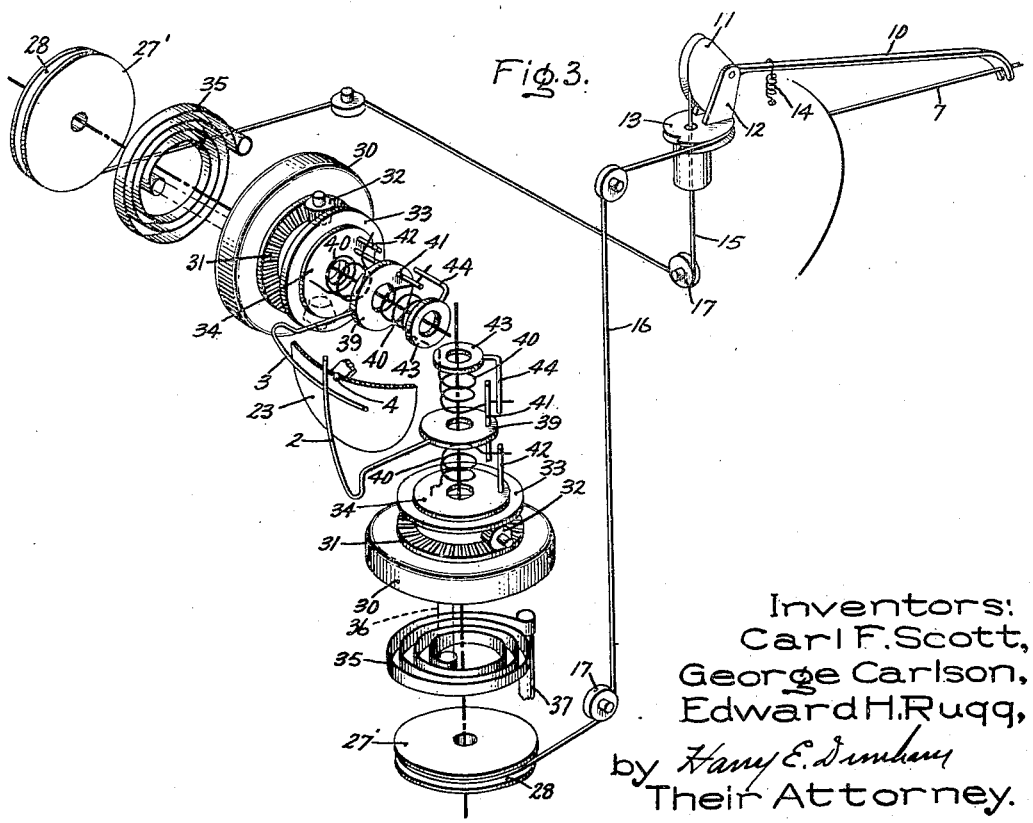
Inventors:
Carl F. Scott,
George Carlson,
Edward H. Rugg,
by Harry E. Dunham
Their Attorney.

Oct. 12, 1948. C. F. SCOTT ET AL 2,451,244
GLIDER TOW INDICATOR
Filed March 22, 1945 2 Sheets-Sheet 2

Inventors:
Carl F. Scott,
George Carlson,
Edward H. Rugg,
by Harry E. Dunham
Their Attorney.

Patented Oct. 12, 1948

2,451,244

UNITED STATES PATENT OFFICE 2,451,244

GLIDER TOW INDICATOR

Carl F. Scott, Milford, George Carlson, Trumbull, and Edward H. Rugg, Bridgeport, Conn., assignors to General Electric Company, a corporation of New York Application March 22, 1945, Serial No. 584,210

11 Claims. (Cl. 33—1)

Our invention relates to an indicator for aircraft and more particularly to an indicator adapted for use with a glider being towed by a powered aircraft.

When towed by a powered aircraft it is important that the pilot of a glider be able to accurately maintain a certain position behind the towplane. For example, the glider must fly either above or below the turbulent air in the slipstream of the towplane, or if two or more gliders are towed simultaneously, it is important that each glider also maintain its position accurately to avoid contact with the others. Normally, the pilot is able to do this easily by observing the position of the towplane. However, at night time, or when flying through clouds it is necessary for the pilot of the glider to have an indicator which will show changes in position of the glider with respect to the towplane and other gliders. It is to an indicator of this type that our invention relates.

It is an object of our invention to provide an indicator for a towed aircraft which will indicate vertical and horizontal variations in the position of the towed aircraft with respect to that of the powered aircraft.

It is another object of our invention to provide a new and improved indicator which cooperates with the tow rope of the aircraft to indicate deflections of the tow rope with respect to the aircraft.

It is a further object of our invention to provide an improved indicator to indicate deviations in the position of the towed aircraft, the construction being such that the indicator may be adjusted to predetermined settings to account for the flight position of the aircraft.

Figure 4:
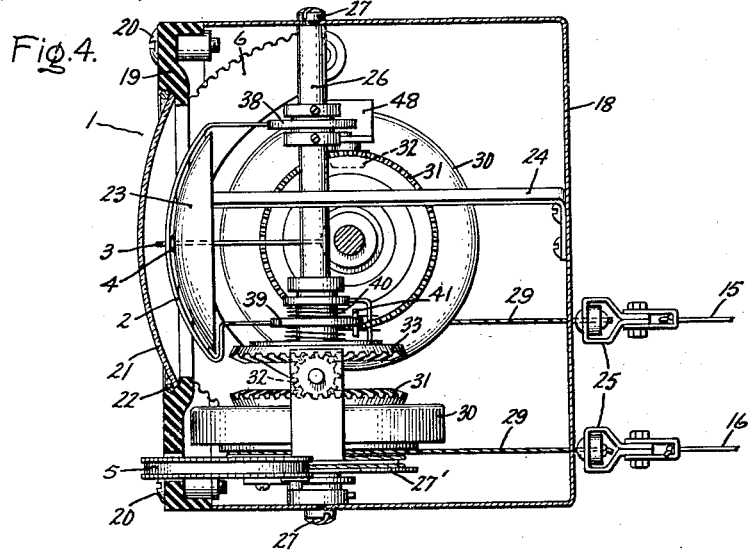
Figure 5:
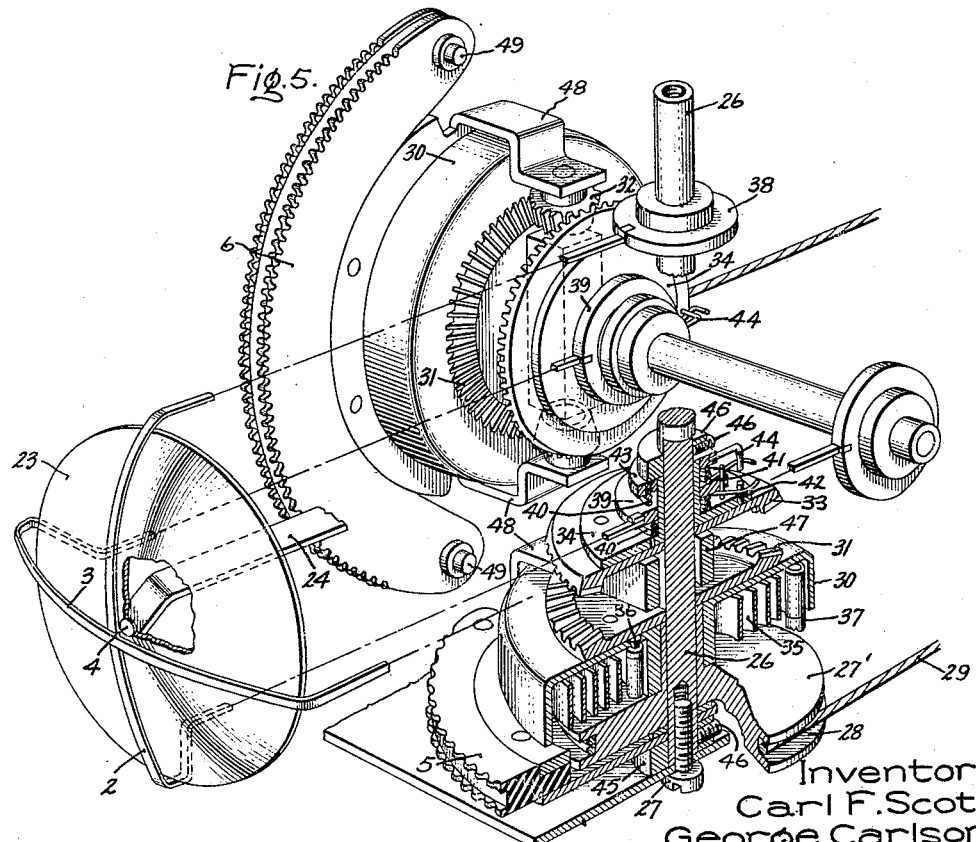

In the accompanying drawing, Fig. 1 is a view of an indicator constructed in accordance with our invention; Fig. 2 is a view showing the arrangement of the indicator when used in conjunction with an aircraft being towed by a powered aircraft; Fig. 3 is an exploded schematic view of part of the structure of the indicator; Fig. 4 is a sectional view through the indicator housing showing the interior arrangement of the elements, and Fig. 5 is a perspective view, partly in section, showing the structure of the indicator.

Referring to the drawing, Fig. 1 illustrates an indicator 1 constructed in accordance with our invention and which is provided with a pointer 2 to indicate horizontal deviations of an aircraft from the angle of a tow rope and a second pointer 3 to indicate vertical deviations. When the towed aircraft is being flown in the proper position, the indicating pointers 2 and 3 will be centered over a disk 4 which determines the normal or zero position of the indicators. An adjusting hand wheel 5 is provided for adjusting the center or zero position of the pointer 2 in accordance with the flight attitude of the towed aircraft and a second hand wheel 6 is provided for adjusting the position of the pointer 3. The manner in which the pointers are adjusted by the hand wheels and the reasons for making this adjustment will be described later.

In the schematic view of Fig. 2 the indicator is shown in use with an aircraft, such as a glider, being towed by a powered aircraft. The indicator 1 is shown installed in the cockpit of the towed aircraft. It is actuated by a mechanism which engages the tow rope 7 fastened between the towed aircraft 8 and the powered aircraft 9. The mechanism for operating the indicator includes an arm 10 one end of which is slotted for engaging the tow rope 7. At its other end the arm carries a vertically disposed cam 11. The arm is pivoted on a bracket 12 for movement in a vertical plane. Likewise, the bracket itself is pivoted to rotate in a horizontal plane and carries a cam 13. A spring 14 holds the arm 10 in engagement with the tow rope 7. A movement transmitting cable or line 15 is connected to the cam 11 of the arm 10 and a second cable 16 is connected to the cam 13 of the bracket 12.

As the towed aircraft 8 changes position with respect to the powered aircraft 9, the change in the angle of the tow rope 7 with respect to the towed aircraft causes a movement of the arm 10 and movement of the cables 15 and 16 in accordance with the horizontal and vertical movements of the arm 10. In this way, an indication of the position of the aircraft 8, with respect to the aircraft 9 will be transmitted to the indicator 1. Fig. 3 shows a suitable arrangement of pulleys 17 for guiding the pull cables 15 and 16 from the operating mechanism to the indicator 1. It should be manifest, however, that the particular pulley arrangement will vary according to any particular installation.

Fig. 4 illustrates the general arrangement of the indicator mechanism assembled within a housing 18. One wall of the housing is formed by a face plate 19 secured to the housing in any suitable manner, as by the screws 20. The face plate is provided with an opening closed by a transparent window 21 of glass or plastic held in position by means of a snap ring 22. The transparent window 21 is made slightly convex in shape. A convex plate 23 is placed in back of the window and is supported by a bracket 24 fastened to the rear wall of the housing. The plate 23 carries the zero indicator or disk 4 and provides a surface over which the indicating pointers 2 and 3 move to indicate vertical and horizontal deviations of the aircraft with respect to the tow plane 9. The pointers 2 and 3 extend entirely across the face of the plate 23 and are given a slightly arcuate configuration to conform to the shape of the disk 23 and to permit them to be pivotally mounted on shafts in back of the plate. The aforementioned pull cables 15 and 16 are connected to the structure of the indicator by means of clamps 25. This arrangement permits easy installation or replacement of the indicator without disturbing the operating mechanism engaging the tow rope.

The mechanism for translating pulls on the cables 15 and 16 into rotation of the pointers 2 and 3 is shown in detail in the perspective view of Fig. 5. Since the mechanism for moving one of the pointers is the same as that used to rotate the other, only one mechanism will be described, it being understood that the other is the same in all respects. As shown in Figs. 4 and 5, the two mechanisms are located at right angles to each other.

Referring to Fig. 5, the mechanism includes a shaft 26 secured to opposite walls of the housing 18 by any suitable means such as the screws 27 which permit the shaft and the mechanism to be removed from the housing. A pulley 27' is pivotally mounted on the shaft and is provided with a groove 28 for receiving a wire 29 fastened to one of the pull wires 15 or 16. Secured to the pulley 27' is a casing 30 carrying a bevel gear 31. This gear meshes with pinions 32 which, in turn, engage a second bevel gear 33 carried by a sleeve 34 rotatably supported on the shaft 26. The two gears 31 and 33 and the pinions 32 form a differential gear mechanism for translating rotation of the pulley 27' into rotation of the sleeve 34.

A coiled spring 35 is disposed in the casing 30. One end of the spring is fastened to the casing by means of a pin 36 while the other end is fastened to a stud 37 carried by the housing 18. The spring 35 is placed under tension so that the cable 29 rotates the pulley 27' against the action of the spring. However, when the cable 29 is slackened, the spring rotates the pulley in the opposite direction.

The indicating pointer 2 is carried by spaced collars 38 and 39 pivotally supported on the shaft 26. The collar 39 is mounted around the sleeve 34. Coiled springs 40 are carried on the sleeve 34 on opposite sides of collar 39. The end of one spring is fastened to sleeve 34 and the other end engages a pin 41 in the collar 39 and a projection 42 upstanding from the sleeve. Similarly, the other spring 40 is fastened to a disk 43 pinned to the sleeve 34 and rotatable therewith and the end of the spring engages the pin 41 and an arm 44. The purpose of the springs is to provide a lost motion connection between the pointer and the drive sleeve 34. This arrangement is such that if the pointer 2 is moved to one side to its extreme limit of travel against the wall of the housing, or a stop fastened to the wall, any further movement of the gear 33 will be taken up in winding the springs 40 so that damage to the pointer 2 is prevented. In other words, the springs 40 permit overtravel of the gear 33 after the pointer 2 has reached its limit of movement. The assembly of elements mounted on shaft 26 is held in position by spaced collars 45 positioned on the shaft by set screws 46.

The pinions 32 are connected together by a collar 47 loosely mounted on the shaft 26. The collar and pinions are supported between spaced brackets 48 which extend over the edge of the casing 30 and are fastened to one of the hand wheels 5 or 6. The hand wheels and brackets 48 form a yoke for moving the pinions back and forth around the peripheries of the bevel gears. The hand wheels 5 and 6 are constructed on a large radius and as shown in Figs. 1 and 4 project through the face plate 19 so that they are readily accessible. Stops 49 on opposite ends of the hand wheel engage the face plate 19 to limit movement thereof.

It will be apparent that if the bevel gear 31 is held in fixed position by the pulley 27', any rotation of the pinions 32 caused by movement of the hand wheel will cause the other gear 33 to rotate about the shaft so that the associated pointer is moved to a new position. In this way, the pointers may be adjusted to the center or zero position irrespective of the position of the pulley 27'. One advantage of this arrangement is that it makes for ease of installation. The pointers may be set in a position approximately near center or zero and then the cables 29 can be connected to the pull cables 15 and 16 of the operating mechanism without the necessity of accurately aligning the pointers.

The operation of the construction will be apparent from the diagrammatic showing of Fig. 3. If the glider veers to the left, the angle of the tow rope 7 will be changed with respect to the center line of the glider and this will cause arm 10 to pivot, moving the pull cable 16. Actually, tension on the pull wire 16 will be lessened and this slack will be taken up by the coiled spring 35 so that the pulley 27' will rotate on the shaft 26. As the pulley 27' rotates, its motion is transferred by the differential gearing to the sleeve 34 and thence by means of the springs 40 to the collar 39 carrying the pointer 2. If the glider veers to the right, the arm 10 will pull the wire 16 against the action of the spring 35 and rotate the pulley 27 and pointer 2 in the opposite direction. Conversely, if the towing plane changes course, the tow rope will change position and hence the new course will be indicated to the glider pilot.

After the glider is in flight, the glider pilot assumes the desired position behind the towplane. This desired position will depend upon the number of gliders being towed by the towplane and whether the glider pilot desires to fly above or below the slip-stream of the towplane propellers. The indicator is adjusted to zero indication by means of the hand wheels 5 and 6 and the glider pilot thereafter maintains his position by keeping the indicator pointers 2 and 3 over the disc 4. If the departure is at night time the adjustment of the hand wheels would be made previously or a notation or proper setting made during the previous day time flight.

What we claim as new and desire to secure by Letters Patent of the United States, is:

1. A tow rope indicator for aircraft comprising, in combination, a member adapted to engage a tow rope and respond to horizontal and vertical deflections of an aircraft with respect to a tow rope, indicating means including two pointers, means interconnecting said member with said pointers whereby said pointers indicate vertical and lateral variations in position of an aircraft with respect to a tow rope, and a separate means associated with each of said pointers for adjusting the pointers to zero position in accordance with the desired position of an aircraft with respect to a tow rope.

2. A tow rope indicator for aircraft comprising, in combination, a member adapted to engage a tow rope and respond to horizontal and vertical deflections of an aircraft with respect to a tow rope, separate indicating means connected with said member to indicate vertical and lateral variations in position of an aircraft with respect to a tow rope, and means for adjusting the indicating means to zero position in accordance with the desired position of an aircraft with respect to a tow rope.

3. A tow rope indicator for aircraft comprising, in combination, a member adapted to engage a tow rope and respond to horizontal and vertical deflections of an aircraft with respect to a tow rope, indicating means including two movable indicating members, mechanical connections between said member and said indicating members whereby said indicating members indicate vertical and lateral variations in position of an aircraft with respect to a tow rope, and means for adjusting the mechanical connections to set said indicating members at zero position in accordance with the desired position of an aircraft with respect to a tow rope.

4. A tow rope indicator for aircraft comprising, in combination, an arm adapted to engage a tow rope and respond to deflections of an aircraft with respect to a tow rope, indicator means including a pivoted member, means including a differential gearing interconnecting said pivoted member and said arm and means for adjusting a portion of said differential gearing to set the pivoted member at zero position in accordance with the desired position of an aircraft with respect to a tow rope.

5. A tow rope indicator for aircraft comprising, in combination, an arm adapted to engage a tow rope and being responsive to deflections of an aircraft with respect to a tow rope, a pivoted indicating member, drive means for said indicating member including spaced bevel gears with an interconnecting pinion gear, means including one of said bevel gears for operating said indicating member, means including the other bevel gear connected to said arm whereby said indicating member is operated in accordance with movement of said arm, and manually operable means connected to said pinion for adjusting the relative positions of said bevel gears to set the indicating member in accordance with the desired position of an aircraft with respect to a tow rope.

6. A device for indicating the position of an aircraft with respect to a tow rope comprising, in combination, an indicating member, drive means for the indicating member including spaced gears interconnected by a pinion, means for connecting one of said gears to said indicating member, means for rotating the other gear in accordance with deflections of an aircraft with respect to a tow rope, and means for moving said pinion for adjusting the relative positions of said gears to set the indicating member in accordance with the desired position of an aircraft with respect to a tow rope.

7. A device for indicating the position of an aircraft with respect to a tow rope comprising, in combination, a member movable in accordance with the position of an aircraft, a differential gear mechanism including spaced gears interconnected by a pinion, means for driving one of said gears in accordance with movement of said movable member, an indicating member, means connecting said indicating member to the other gear and means for moving said pinion for adjusting the relative positions of said gears to set the position of the indicating member in accordance with a desired position of the aircraft.

8. A device for indicating the position of an aircraft with respect to a tow rope comprising, in combination, a drive member adapted to be actuated in accordance with the position of an aircraft, a differential gear mechanism including spaced gears interconnected by a pinion, means for driving one of said gears in accordance with movement of the drive member, an indicating member, means connecting said indicating member to the other gear, said last-mentioned means providing for overtravel of the other gear after the indicating member reaches its limit of travel and means for moving said pinion for adjusting the relative positions of said gears to set the position of the indicating member in accordance with the desired position of an aircraft.

9. In an indicator structure, a differential gear mechanism including spaced gears interconnected by a pinion, drive means for one of said gears, a pivoted indicating member, means connecting said indicating member to the other gear including a spring providing for overtravel of the other gear after the indicating member reaches its limit of travel, and means for moving said pinion for adjusting the relative positions of said gears to set the indicating member at a predetermined position.

10. In an indicator structure, a differential mechanism including spaced rotatable members and a rotatable element between said members for transmitting rotation of one to the other, drive means for one of said rotatable members, a movable indicating member, means connecting said indicating member with the other rotatable member including a spring providing for overtravel of the other rotatable member after the indicating member reaches its limit of travel and means for moving said rotatable element for adjusting the relative positions of said rotatable members to set the indicating member at a predetermined position.

11. In an indicator device, a shaft, a rotatable drive member mounted on said shaft, a differential drive mechanism carried by said shaft and including spaced rotatable members interconnected by a rotating element, means connecting the drive member to one of said rotatable members, a pivoted indicating member mounted on said shaft, spring means interconnecting the indicating member and the other of said rotatable members, said spring means providing for overtravel of said other rotatable member after the indicating member reaches its limit of travel, and a manually operable means for rotating said rotating element of adjusting the relative positions of said rotatable members to set the indicating member at a predetermined position.

CARL F. SCOTT.
GEORGE CARLSON.
EDWARD H. RUGG.

REFERENCES CITED

The following references are of record in the file of this patent:

UNITED STATES PATENTS

| Number | Name | Date |
|---|---|---|
| 2,386,884 | Carlson | Oct. 16, 1945 |